United States Patent
Krishnamurthy et al.

(10) Patent No.: US 8,468,371 B2
(45) Date of Patent: Jun. 18, 2013

(54) ENERGY MANAGEMENT FOR DATACENTERS

(75) Inventors: Rajaram B. Krishnamurthy, Wappingers Falls, NY (US); Naseer S. Siddique, Poughkeepsie, NY (US); Casimer M. DeCusatis, Poughkeepsie, NY (US); Anuradha Rao, Hopewell Junction, NY (US); Michael Onghena, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 12/637,804

(22) Filed: Dec. 15, 2009

(65) Prior Publication Data
US 2011/0145603 A1 Jun. 16, 2011

(51) Int. Cl.
*G06F 1/26* (2006.01)
*G06F 15/173* (2006.01)
(52) U.S. Cl.
USPC ........... 713/300; 713/310; 713/320; 713/321; 713/322; 713/323; 713/324; 713/330; 713/340
(58) Field of Classification Search
USPC .................. 713/300, 310, 320–324, 330, 340
See application file for complete search history.

(56) References Cited

U.S. PATENT DOCUMENTS

| | | | |
|---|---|---|---|
| 5,715,443 A | 2/1998 | Yanagihara et al. | |
| 6,178,362 B1 | 1/2001 | Woolard et al. | |
| 6,785,675 B1 | 8/2004 | Graves et al. | |
| 7,043,727 B2 * | 5/2006 | Bennett et al. | 718/100 |
| 8,126,750 B2 * | 2/2012 | Tien et al. | 705/7.11 |
| 2007/0124735 A1 * | 5/2007 | Kalyanasundaram et al. | 718/107 |
| 2010/0153545 A1 * | 6/2010 | Mizuno | 709/224 |
| 2010/0287559 A1 * | 11/2010 | Mergen et al. | 718/103 |
| 2011/0055613 A1 * | 3/2011 | Mandyam | 713/340 |

OTHER PUBLICATIONS

"zArchitecture—Principles of Operation," IBM Publication No. SA22-7832-07, Feb. 2009.

* cited by examiner

*Primary Examiner* — M Elamin
(74) *Attorney, Agent, or Firm* — Steven Chiu, Esq.; Blanche E. Schiller, Esq.; Heslin Rothenberg Farley & Mesiti P.C.

(57) ABSTRACT

A datacenter schedules and executes requests to conserve energy. The datacenter uses an event-based opportunistic approach to schedule and run the requests, which provides energy efficiency. The requests are hierarchically batched and sent to the datacenter for scheduling and execution. They are selectively sent over low power links and selectively serviced by low power processors.

22 Claims, 6 Drawing Sheets

ENERGY MANAGEMENT FOR DATACENTERS

BACKGROUND

This invention relates, in general, to facilitating processing associated with a datacenter, and in particular, to managing servicing of requests by the datacenter for energy efficiency.

A datacenter is a facility used to house computer systems (e.g., servers) and associated components, such as telecommunications and storage systems. Typically, it includes redundant or backup power supplies, redundant data communications connections, environmental controls and security devices. Datacenters are used to service requests from clients coupled to the datacenters.

A client initiates a request for a service, which is sent from the client to the datacenter via a link. In response to receiving the request, a system within the datacenter performs the requested service, such as a search. The datacenter system receives the results and forwards a reply to the client.

The processing of a request, including sending the request, servicing the request and replying to the client, utilizes energy, such as the energy expended by the processor, memory and input/output. The amount of energy consumed is measured by instrumentation executing on the systems.

BRIEF SUMMARY

The energy used to service requests is managed by controlling the processing of the requests. The processing of the requests is performed in a manner in which energy is efficiently utilized, including minimizing the amount of energy consumed.

The shortcomings of the prior art are overcome and additional advantages are provided through the provision of a computer program product for managing requests in a computing environment. The computer program product comprises a storage medium readable by a processing circuit and storing instructions for execution by the processing circuit for performing a method. The method includes, for instance, receiving, by at least one processor, a global batch of requests, the global batch of requests comprising a plurality of locally batched requests combined to provide the global batch of requests; determining whether a request of the global batch of requests is to be scheduled to run, wherein the determining uses a utility function that is based on energy aspects of the computing environment to determine if the request is to be scheduled; and scheduling the request to run, in response to the determining indicating the request is to run.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for managing client requests that are to be serviced by a datacenter such that energy is conserved. Clients may send regular requests to the datacenter, as well as green requests. Regular requests are performed in the typical manner with emphasis on performance and execution time, while green requests are performed in a manner in which performance and execution time may be traded for a lower energy footprint.

Figure 1:
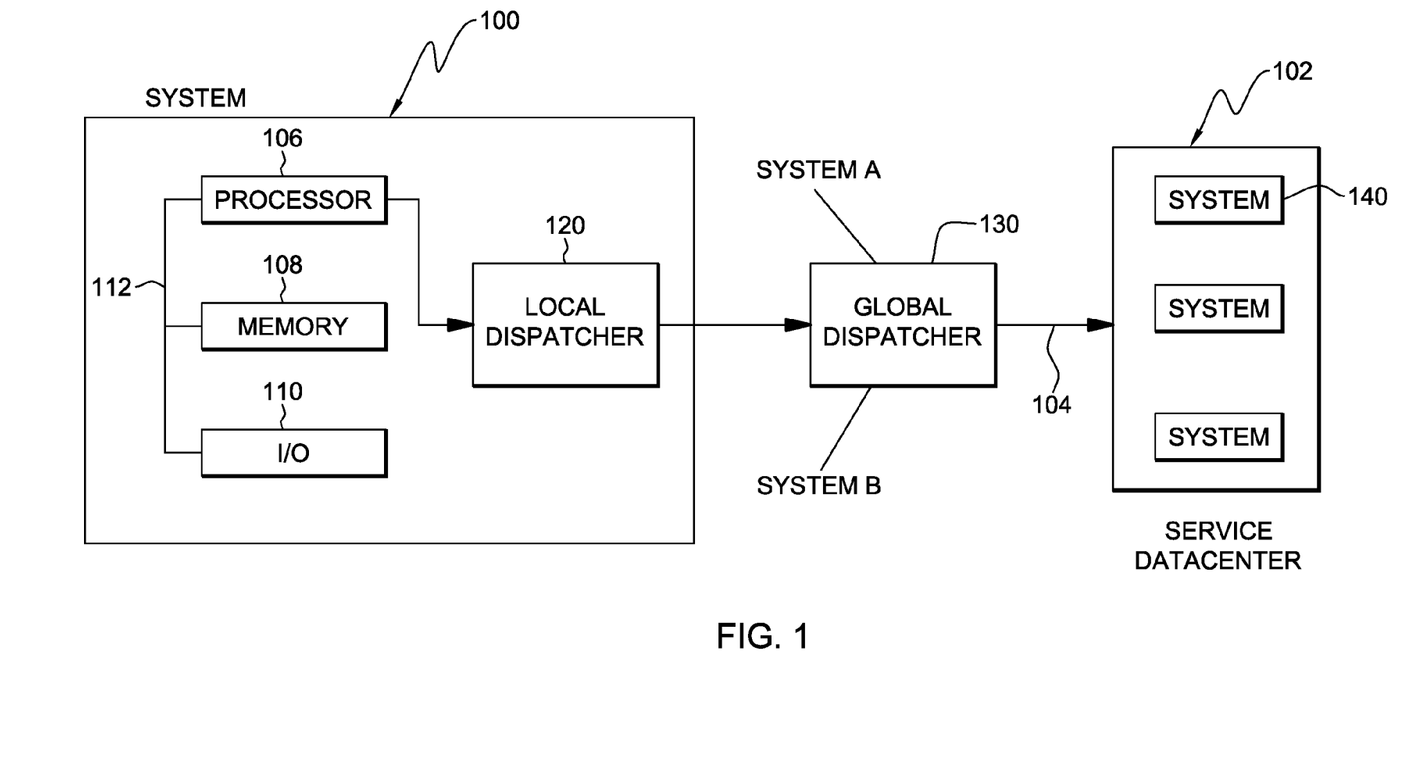
FIG. 1 depicts one embodiment of a computing environment to incorporate and use one or more aspects of the present invention.

One embodiment of a computing environment to incorporate and use one or more aspects of the present invention is depicted in FIG. 1. In this example, a system 100 (also referred to as a client) is coupled to a service datacenter 102 via one or more links 104. System 100 includes, for instance, one or more processors 106, a memory 108, and one or more input/output devices or interfaces 110 coupled to one another via one or more buses 112. As examples, system 100 is a System p®, System x® or System z® server offered by International Business Machines Corporation (IBM®), Armonk, N.Y. IBM®, System p®, System x® and System z® are registered trademarks of International Business Machines Corporation, Armonk, N.Y. Other names used herein may be registered trademarks, trademarks or product names of International Business Machines Corporation or other companies.

In another embodiment, system 100 includes one or more partitions or zones. For example, the system is a logically partitioned System z® server based on the z/Architecture® offered by International Business Machines Corporation. The z/Architecture® is described in an IBM® publication entitled "z/Architecture—Principles of Operation," IBM Publication No. SA22-7832-07, February 2009, which is hereby incorporated herein by reference in its entirety. z/Architecture® is a registered trademark of International Business Machines Corporation, Armonk, N.Y.

Executing on system 100 is a local dispatcher 120 which receives requests from, for instance, system user interfaces and/or applications executing on one or more processors of the system and determines when to dispatch those requests towards the datacenter. For instance, the local dispatcher batches the requests into one or more locally batched requests until a predefined criterion is met such as, for instance: a number of requests is received that satisfies a given threshold; a periodic time T has expired; or green links (described below) are available. These requests may be batched based on a selected criterion, such as type of request (e.g., green requests and/or other types of requests) or other selected criteria. In response to meeting the predefined criterion, the local dispatcher dispatches the locally batched requests to a global dispatcher 130.

Global dispatcher 130 executes on a device coupled to system 100 and datacenter 102, such as a server or an appliance attached to a switch, etc. The global dispatcher accepts locally batched requests from multiple systems and batches them into one or more global batches of requests. For instance, the global dispatcher may batch requests based on selected criteria, such as type of request, etc. The global dispatcher schedules communications to the datacenter based on one or more scheduling rules, including, for instance: receipt of enough requests that a predefined threshold is met; a periodic time T has expired; or green links are available for transmission.

In one particular embodiment, the global dispatcher and local dispatchers are arranged in a fat tree network to enable requests to be cascaded. The global dispatcher forms the root of the fat tree, while the local dispatchers form leaf nodes of the fat tree. As known, the links in a fat tree become "fatter" as one moves up the tree towards the root. This allows local dispatchers to push data to the global dispatcher with high efficiency and bandwidth, and minimal queuing delay. By choosing the fatness of the links, the network can be tailored to efficiently use any bandwidth made available by packaging and communications technology.

Coupled to the global dispatcher is service datacenter 102. Datacenter 102 includes one or more systems 140 used to receive and service requests. In one example, the systems may be System x®, System p® or System z® servers, as well as other types of computing units.

There may be several links coupling system 100, global dispatcher 130 and datacenter 102. For example, there may be regular network links and/or green network links. The regular network links are to service regular requests. These requests are not serviced based on energy constraints or an energy profile. In contrast, green network links are used to service green requests where performance and execution time may be traded for lower energy consumption. As examples, the green links are reserved physical network links that may be turned on when needed from end-to-end between the client and datacenter; and/or low priority virtual lanes of a physical link. In one particular example, the green links are optical links.

In one embodiment, the green links (also referred to herein as low power links) are used to forward a request from a client to a service datacenter that is to service the request. One embodiment of details regarding the flow of requests from a client to a datacenter is described with reference to FIG. 2. Initially, a user makes a green service request (e.g., a search request, such as a Google search request) and indicates that it is a green request, by, for instance, tagging the request as such (e.g., setting a flag), STEP 200. A local dispatcher receives the user request and batches it with other green requests received across applications of the system, STEP 202. The request may be batched with other requests solely on the fact that they are green requests; based on the fact they are green requests and other criteria, such as of a particular type, as an example; or based on other criteria. These requests are batched until a predefined criterion is met, such as enough requests have been received to meet or exceed a predefined threshold; a periodic time T has expired; or there are green links available for transmission, as examples.

Figure 2:
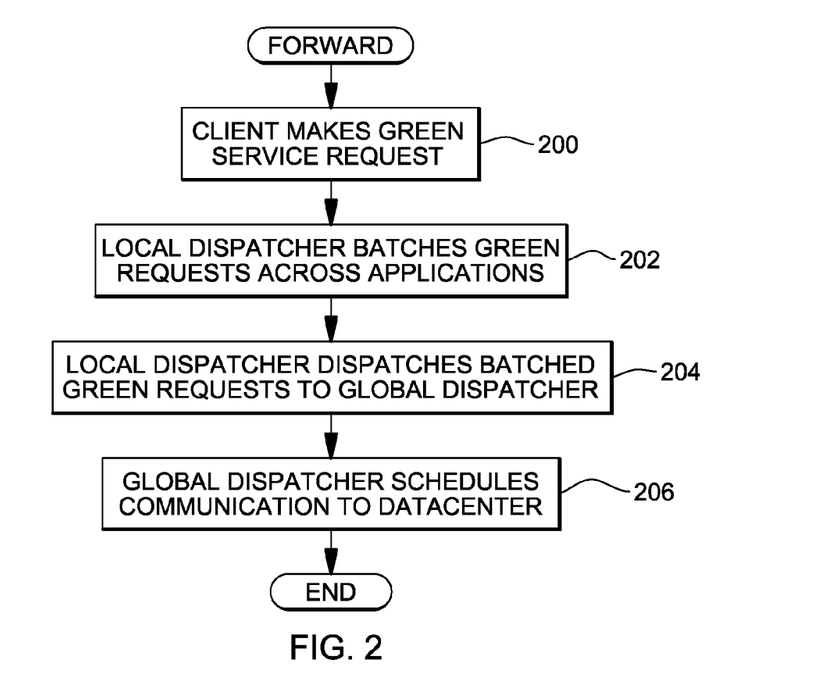
FIG. 2 depicts one embodiment of the logic to forward a request from a client to a datacenter of the computing environment, in accordance with an aspect of the present invention.

At the appropriate time, the local dispatcher dispatches the locally batched green requests to a global dispatcher, STEP 204. The global dispatcher receives and batches green requests from system 100, as well as from other systems, until again a predefined criterion is met, such as those described above. The global dispatcher then schedules a communication to the datacenter, STEP 206.

To send the globally batched requests to the datacenter, one or more links are used. In one example, green network links are used, such as optical links. In particular, power in an electrical switch is directly proportional to the bit rate, while power in an optical switch is directly proportional to the cell rate. Thus, in one example, a green routing protocol is used that locates optical switches to route packets. For example, a network switch can have a combination of optical or copper data ports. The type of port may be identified by various types of vital product data (VPD), which is encoded within the optical or copper transceiver components (for example, in nonvolatile memory), and is read out by the switch operating system. (For example, in some systems an industry standard communication bus and identification protocol are used to transfer link identification data from the optical or copper transceivers to the network switch memory where it can be accessed by the switch operating system.) In this manner, the switch operating system is aware of the number and type of switch ports available for use. A green routing protocol can take advantage of this information to select links which are lower power consumption, such as optical links, when there is a choice between different link types to transfer data. This is just one example; other schemes are possible.

In a further embodiment, a dynamic routing protocol is used that looks for switches at each hop that are optimally loaded for better energy efficiency (e.g., a 40% loaded switch may be better than a 10% loaded switch, in terms of energy efficiency). Energy probe packets may be inserted in front of regular data packets that probe energy states of switches for optimal energy routing assessment. Routing decisions are then made on a hop-by-hop basis. The probe packets can turn on the green links prior to sending the communication. For example, when traffic conditions are relatively stable, the probe packets preferentially select switches which are more than, for instance, 40% loaded, and are thus, operating at a higher energy efficiency. In cases where the data traffic is rapidly increasing, the probe packets preferentially route the growing amount of traffic through switches which can most quickly be ramped up to a 40% load or greater, thus converting lower efficiency switches into higher efficiency switches rather than spreading the workload across more switches in a lower efficiency manner.

In one embodiment, green search requests waiting to reach batch thresholds can be co-scheduled with regular requests. For instance, if dataset disks are set into spin motion from idle state, green search requests can be co-scheduled with regular search requests by piggybacking green search requests with regular search requests. Specifically, a disk set in motion for servicing a regular request may entertain a green request that requires data on the same disk. As another example, unused storage bandwidth to a disk for regular requests may be used by green requests. The idea is to use resource "headroom" from regular requests to service green requests without perturbing regular requests. As another example, if solid-state memory banks are activated for regular search requests, then green search requests can be co-scheduled with regular requests to further amortize the memory bank activation time.

Such piggybacking is achieved by queuing green requests and regular requests in separate queues. Green requests may be queued in separate queues based on groupings (e.g., requests to the same disk) where piggybacking can be achieved. Additionally, memory caching may be extended to include disk as tertiary storage, so that green requests may still benefit from cached results, but may retrieve results slower (with lower energy footprint) as these may be steered to electromechanical or solid state disk than solid-state memory.

Figure 3:
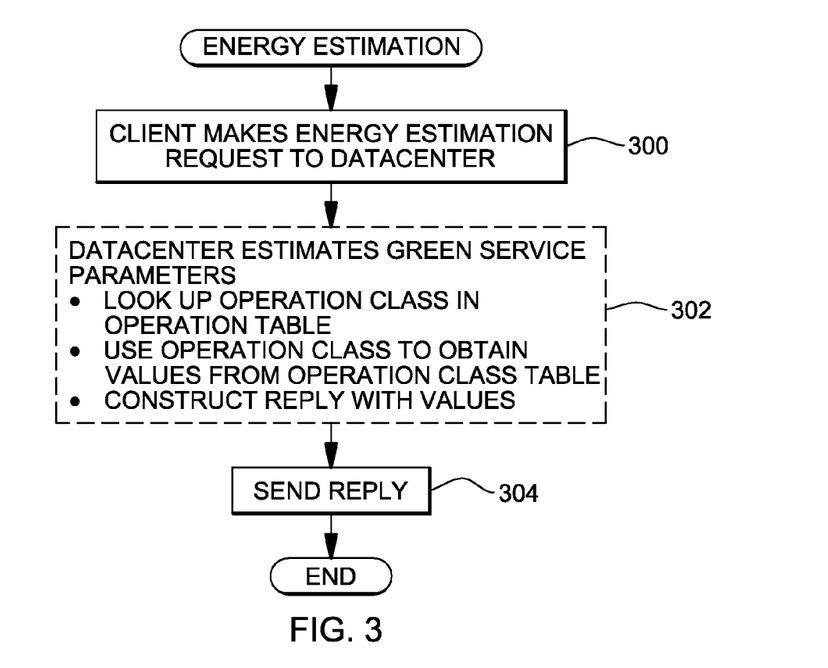
FIG. 3 depicts one example of the logic to estimate energy use, in accordance with an aspect of the present invention.

Since there is typically a cost associated with using green requests in terms of performance and execution time, in one particular embodiment, a client may wish to know that cost prior to issuing the green request. If the cost is too high, the client may choose to issue a regular request for regular service. One embodiment of the logic associated with estimating the energy cost is described with reference to FIG. 3. Initially, the client makes an energy estimation request to the datacenter, STEP 300. This request is carried along regular links and includes the operation for which an energy estimate is desired. In response to receiving the request, the datacenter estimates one or more green service parameters, as described herein, STEP 302. To perform this estimation, in one example, the datacenter uses information stored in various data structures. For instance, the datacenter queries and obtains information from an operation table and an operation class table.

Figure 4A:
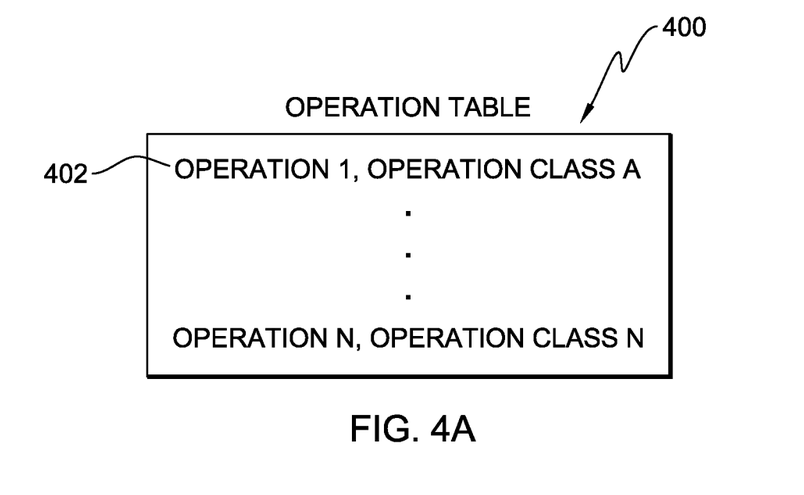
FIG. 4A depicts one example of an operation data structure used in accordance with an aspect of the present invention.

One example of an operation table is described with reference to FIG. 4A. An operation table 400 includes a plurality of entries 402, and each entry includes, for instance, a specified operation and an operation class associated with that operation. The operations are actions that may be specified in the requests. For instance, an operation may be included in a request that indicates a search of an image. In this example, the operation class is image searching. Other classes may be alphanumeric searching, video searching, as well as others. Many other operations and operation classes are possible. These would be defined and stored in table 400 (or another type of data structure). In one example, operation classes may be defined based on datasets that reside in-memory (search cache) and datasets that reside on the disk.

Figure 4B:
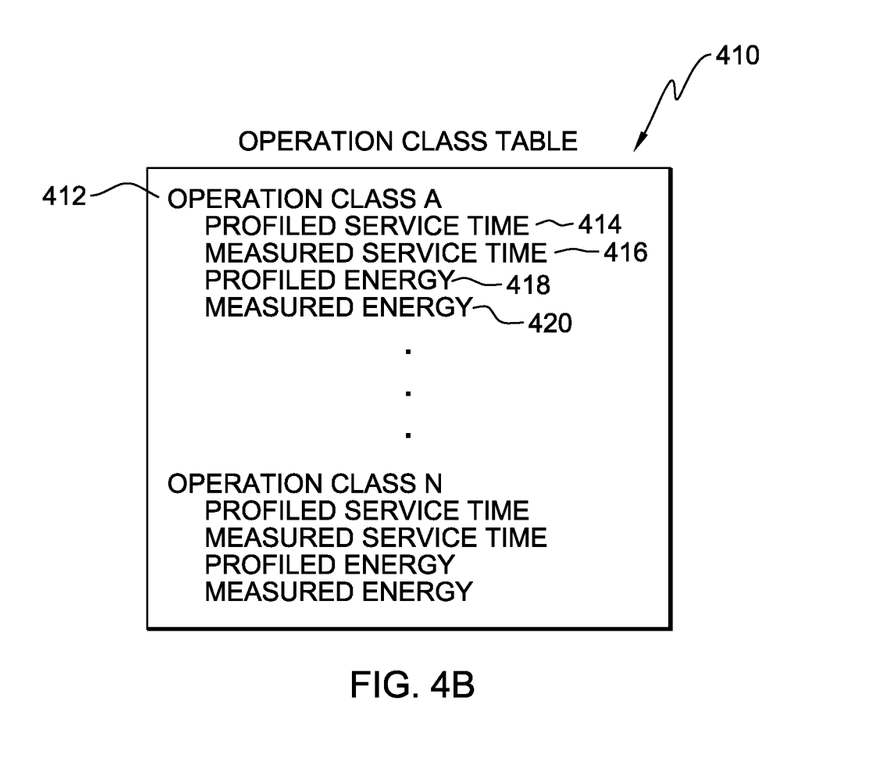
FIG. 4B depicts one example of an operation class data structure used in accordance with an aspect of the present invention.

Each operation class has parameters associated therewith and these are described in an operation class table 410, an example of which is depicted in FIG. 4B. As shown, in one example, each operation class 412 includes a plurality of parameters including, for instance: a profiled service time 414, which indicates how long it takes to run this operation in isolation; a measured service time 416, which indicates how long it takes to run this operation while other operations are running; a profiled energy 418, which specifies the amount of energy (watt-hours) consumed running this operation in isolation; and measured energy 420, which specifies the amount of energy consumed performing this operation, among others. The profiled and measured energy are obtained by using instrumentation, such as the Active Energy Manager provided by International Business Machines Corporation, that executes on the server measuring the energy. For measured service time and measured energy, the average, minimum, maximum and standard deviation over a defined window are provided, in one example.

In one example, service time for an operation is estimated by aggregating the mean service time for an operation class. The service time model may also include parameters to incorporate performance benefits because of regular and green request co-scheduling.

Returning to FIG. 3, to calculate the energy estimate, the operation specified in the request for which an estimate is desired is looked up in the operation table to obtain the operation class. That operation class is then used to obtain the energy values from the operation class table. Those values are then placed in a reply, which is sent to the client, STEP 304. The client can then decide, based on the returned energy values, whether it would like to send a green request or a regular request for this specific operation.

In accordance with a further aspect of the present invention, green service requests are serviced in an event-based opportunistic approach. With this approach, various queues are used, including a work queue that collects work requests from the global dispatcher to be executed; a wait queue that collects requests selected for execution, but waiting for resources, such as processor resources; and a run queue, which is a queue of the currently running processes on datacenter servers. These queues are used in scheduling and/or running a request, as described herein. In particular, one embodiment of the logic associated with scheduling a request is described with reference to FIG. 5; and one embodiment of the logic to migrate requests during runtime is described with reference to FIG. 6. The logic for these flows is performed by one or more servers in the datacenter.

Figure 5:
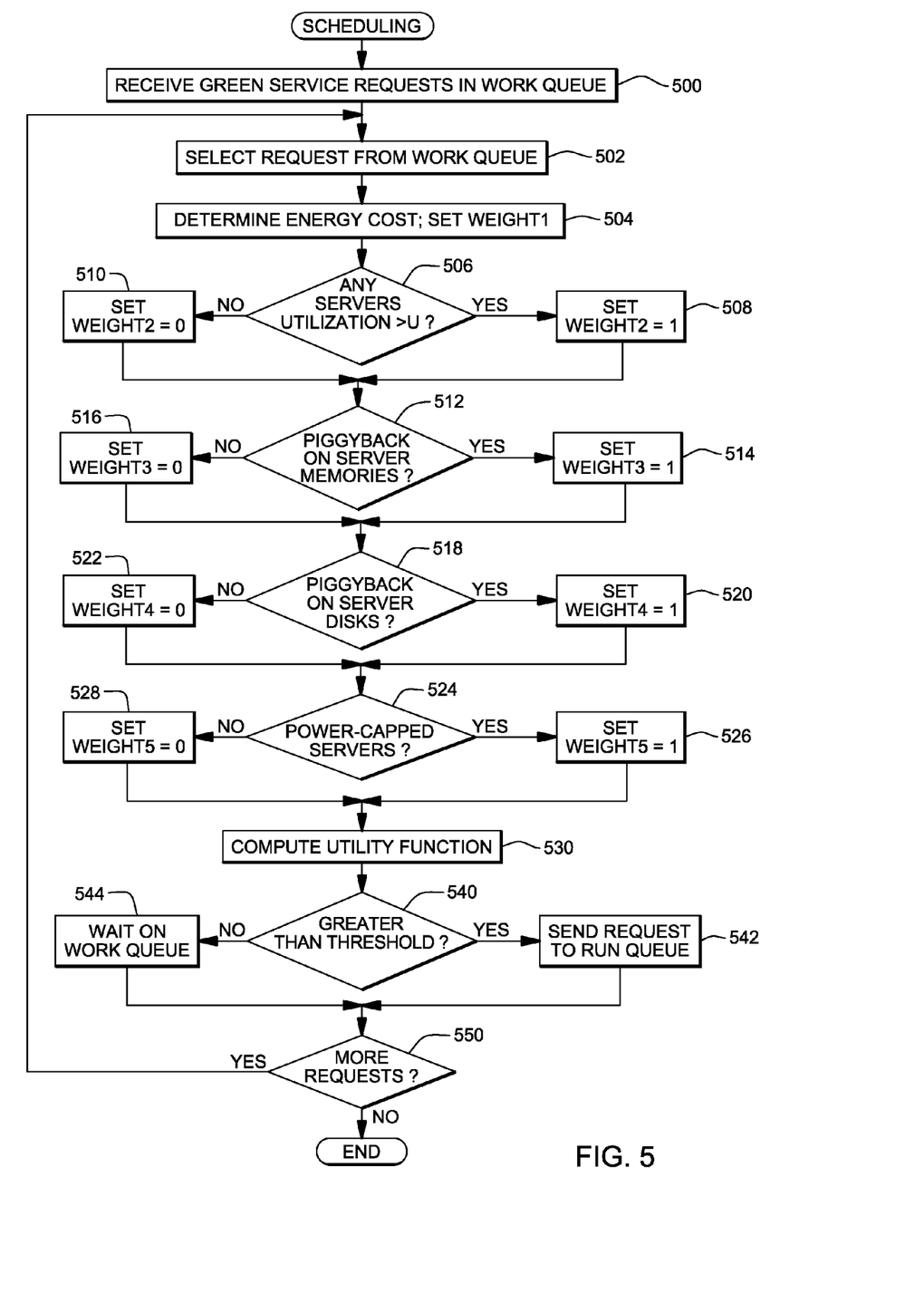
FIG. 5 depicts one embodiment of the logic to schedule requests, in accordance with an aspect of the present invention.

Referring initially to FIG. 5, one or more green service requests are received in the work queue at the datacenter, STEP 500. A loop through the requests in the work queue is performed to determine if a request can be moved from the work queue to the run queue. A request is selected, STEP 502, and a number of inquiries are made to assist in the determination. For instance, for the selected request, a determination is made as to the energy cost for the request, STEP 504. This cost is a dollar value that indicates how much money it costs to run the operation in the request. It is, for instance, number of watt-hours×price per watt-hour. This information may be obtained from a table or other data structure that includes for each operation one or more energy costs depending on factors, such as time of day (e.g., price per watt-hour is different for different times of day). If, for instance, the energy cost is less than a value of cost1 (a predefined value), then a variable, weight1, is set equal to 3; if it is less than a value of cost2 (another predefined value), but greater than cost1, then weight1 is set equal to 2; and if it is greater than cost2, then weight1 is set equal to 1.

A further determination is made as to whether there are any servers where utilization is greater than a user defined threshold, U, INQUIRY 506. If there are servers greater than the threshold, then a variable, weight2, is set equal to 1, STEP 508. Otherwise, weight2 is set equal to 0, STEP 510. Additionally, a determination is made as to whether there are any server memories where green service requests can be piggybacked on regular service requests, INQUIRY 512. If green service requests can be piggybacked on regular service requests, then a variable, weight3, is set equal to 1, STEP 514. Otherwise, weight3 is set equal to 0, STEP 516. A yet further determination is made as to whether there are any server disks where green service requests can be piggybacked on regular service requests, INQUIRY 518. If there are server disks where green service requests can be piggybacked on regular service requests, then a variable, weight4, is set equal to 1, STEP 520. Otherwise, weight4 is set equal to 0, STEP 522.

Also, a determination is made as to whether there are any power-capped servers where these requests can be placed without violating the mean service time values for the requested operation class, INQUIRY 524. If there are power-capped servers where these requests can be placed, then a variable, weight5, is set equal to 1, STEP 526. Otherwise, weight5 is set equal to 0, STEP 528.

After setting the weight values, a chosen utility function is computed using the weight values and the corresponding numeric values of the inquiries, STEP 530. One particular example of a utility function is a weighted average. In such case, the function is computed, as follows:

$$\frac{(A1 \times W1) + (A2 \times W2) + (A3 \times W3) + (A4 \times W4) + (A5 \times W5)}{W1 + W2 + W3 + W4 + W5},$$

where An is the numerical value of the inquiry (e.g., A1 is the energy cost; A2 is the number of servers where utilization is >U; A3 is number of server memories where green requests can be piggybacked; A4 is number of server disks where green requests can be piggybacked; and A5 is number of power-capped servers); and Wn is the weight.

Thereafter, a determination is made as to whether the utility function is greater than a designer chosen threshold T, INQUIRY 540. If so, then the request is scheduled and sent to the datacenter run queue, STEP 542; otherwise, it waits in the work queue, STEP 544. In one example, for optimal service, any workload, input data or datasets needed to perform the operation are preloaded or prelocated (specifying pointers or locations) on the wait queue, so they are ready when the request is ready to run.

If there are more requests to be serviced, INQUIRY 550, then processing continues with selecting the next request from the work queue, STEP 502. Otherwise, the scheduling process is complete.

As examples, requests can be scheduled on regular search machines or separate green search machines. For instance, they can be scheduled on a separate partition (e.g., LPAR) on a regular search machine (with non-dedicated or minimal CPU resources); or scheduled on a separate set of green search machines (optimized for low energy usage). In one example, this includes batching search requests on LPARs for optimal utilization. Search requests and LPARs can be combined together and instantiated on a machine. This co-dispatch (LPAR and data) helps minimize CPU time in idle state waiting for data (static optimization).

In one embodiment, requests may be migrated from low utilization servers to high utilization servers or low utilization servers may be merged to provide a high utilization server allowing a low utilization server to be turned off. One embodiment of migrating data from a low utilization server is described with reference to FIG. 6.

Figure 6:
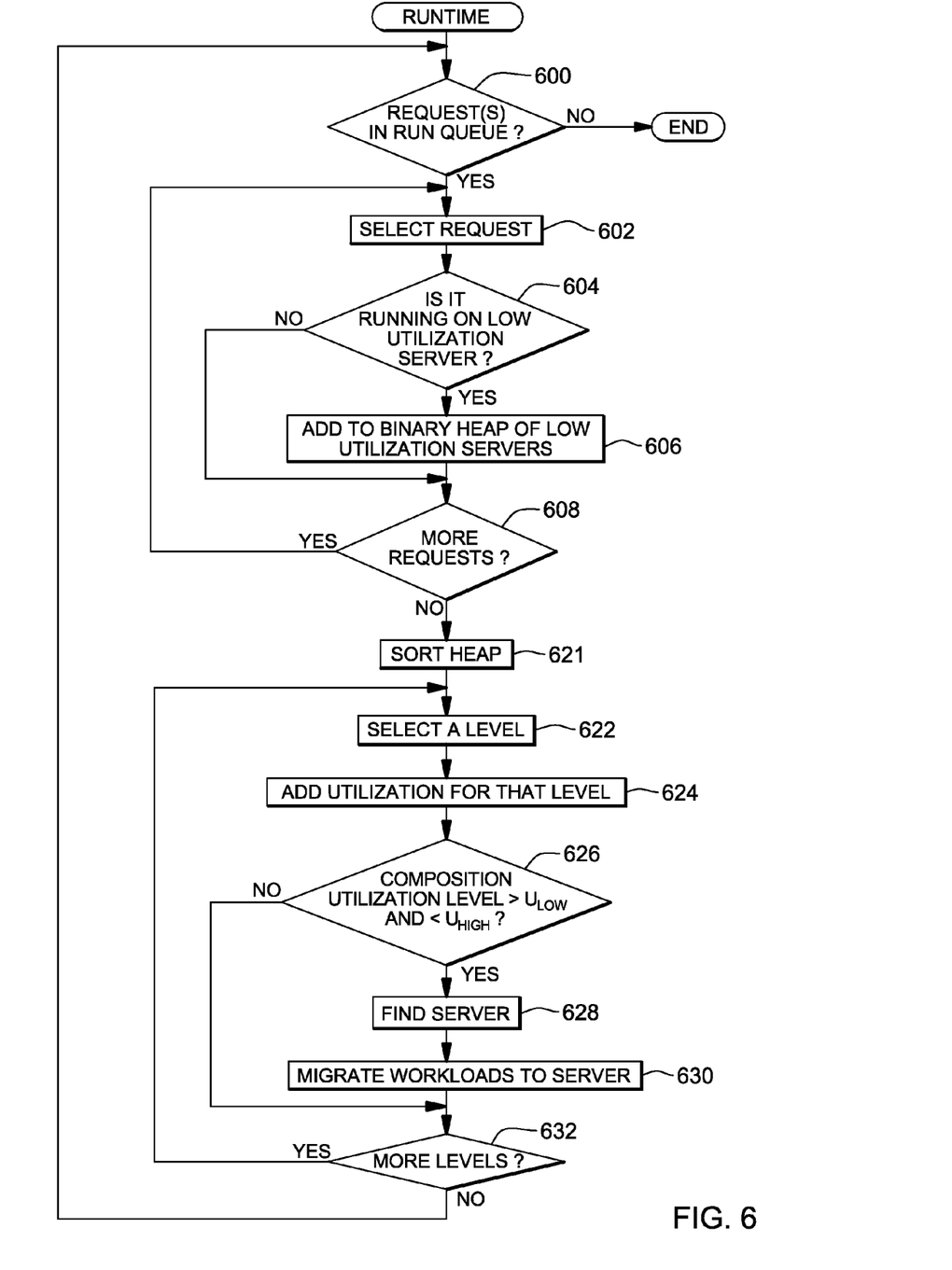
FIG. 6 depicts one embodiment of the logic to migrate requests in runtime, in accordance with an aspect of the present invention.

Referring to FIG. 6, if there is any request in the datacenter run queue, INQUIRY 600, then a request is selected, STEP 602. A determination is made as to whether the request is running on a low utilization server (where utilization is less than U, a predefined value), INQUIRY 604. If the request is running on a low utilization server, then that server is added to a binary heap of low utilization servers, STEP 606. Thereafter, or if it is not running on a low utilization server, a determination is made as to whether there are more requests in the run queue, INQUIRY 608. If there are more requests in the run queue, INQUIRY 608, then processing continues with selecting a request, STEP 602.

Returning to INQUIRY 608, if there are no more requests in the run queue, then the binary heap of low utilization servers is finished being formed. Thus, in one example, the heap is sorted, STEP 621, such that the heap has the server id with the largest utilization request at the root of the tree with other nodes/requests in decreasing order of utilization. The sorted heap is then looped through. For instance, a level of the heap (e.g., outer-most level) is selected, STEP 622, and utilization for that level is added, for instance, in a pair-wise fashion, STEP 624. For example, the heap is represented as a tree to facilitate traversal through the heap, and the tree has a plurality of levels. Assume a tree has a root node A, the root has two children, B and C, and each child has two children, D and E; and F and G, respectively, then this tree has three levels: level 1—root node; level 2—children B and C; and level 3—children D and E; and F and G. The levels are looped through and an addition operation is performed of utilization for each level.

For instance, in one particular example, in a pair-wise fashion: utilization for D and E is added to obtain result 1, which may be added to utilization of B, providing a new result 2. If the addition of D and E is greater than a designer chosen utilization threshold at this level, then D and E can be executed together. Otherwise, the total of B, D and E at the same level is checked for a value greater than a designer defined threshold. If the sum of B, D and E is greater than a designer defined threshold, then B, D and E can be executed on the same system as the aggregate utilization is optimal. Similarly, F and G are added to provide a result which is checked against a threshold, and added to C, if the threshold is not met. If the threshold is still not met, the result from B and C are again added and checked against a threshold. If the threshold is met, then all the requests participating in the cumulative result are executed concurrently on a suitable server. If the threshold is not met, then A is added to B and C and the steps continue.

Subsequent to adding utilization at that level, a determination is made as to whether the composite utilization of the level is greater than Ulow (a defined threshold) and less than Uhigh (another defined threshold), INQUIRY 626. If so, then a server from the one or more servers executing the set of requests participating in the cumulative total is selected that is equidistant from I/O sources of servers aggregated so far, STEP 628. The determination of the "equidistant" server is as follows, in one example. A server is selected. The number of switch hops (for example, other metrics may be used) from this server to the I/O or storage sources of each server is averaged. This process is repeated for each server. The server with the least average distance is selected as the "target server". Other low utilization servers are then migrated to this "target server". Workloads are migrated to the equidistant server from the low utilization servers, STEP 630.

Thereafter or if the utilization level is not greater than Ulow and less than Uhigh, a determination is made as to whether there are more levels to be analyzed, INQUIRY 632. If so, processing continues at STEP 622, in which another level is selected. Otherwise, processing continues with INQUIRY 600 to determine whether there are more requests to be processed. This completes the runtime execution processing.

As an example of the above, assume Ulow and Uhigh are fixed between 70% and 80%. Assume that the utilization sum of two requests A (25%) and C (25%) is 50% and an additional request D (parent node, 50%) in the heap makes the cumulative request 100%. This can be handled in various ways. The sum of A (or C) and D can be used to compose a high utilization server. If this is not possible, the heap can be searched for another entry that keeps the cumulative sum between 70 and 80 percent. If such an entry is found, the nodes can be swapped (D with new found node N in heap). If this is again not possible, the composite sum from A, C, D is not propagated to a higher parent node. Instead, such nodes not included in a total aggregate sum may be isolated and processed later in a future pass.

Described in detail above is an event-based opportunistic execution technique used by a datacenter to schedule and run requests in an energy efficient manner. The requests are received at the datacenter from a hierarchically global dispatcher that obtains locally batched requests from a plurality of sources, batches those requests, and sends them on to the datacenter. The datacenter then processes those requests in a manner which reduces power, energy and the energy footprint.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
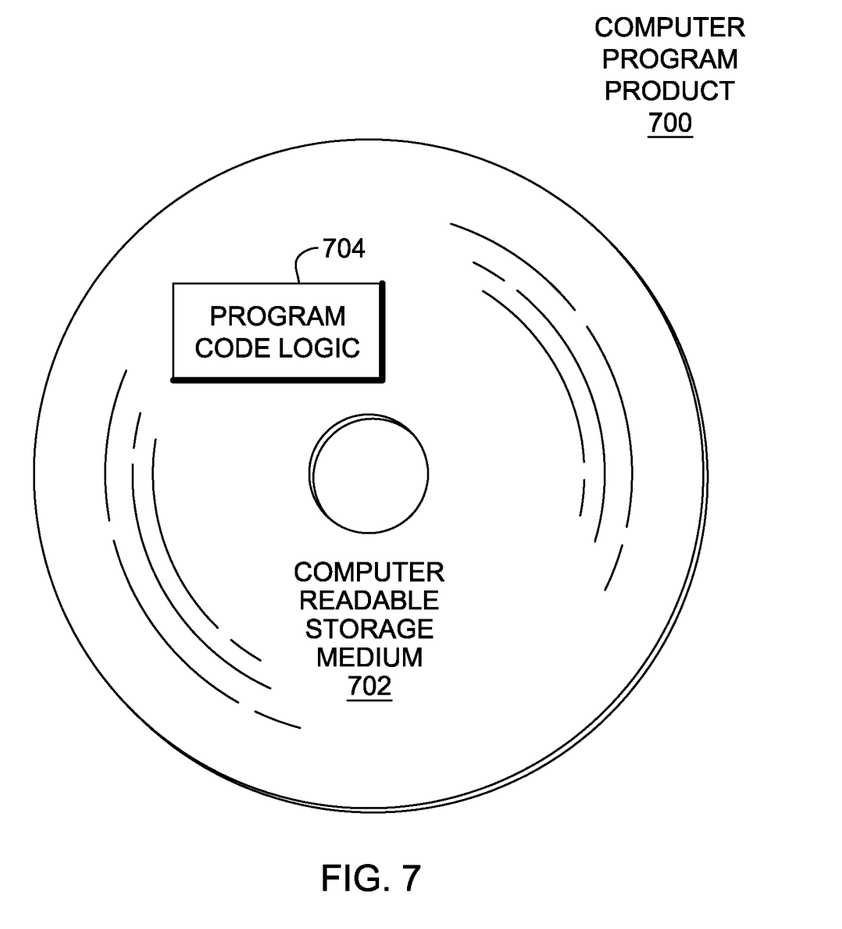
FIG. 7 depicts one embodiment of a computer program product incorporating one or more aspects of the present invention.

Referring now to FIG. 7, in one example, a computer program product 700 includes, for instance, one or more computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, the information provided in the tables or queues may be different, and other types of data structures may be used. Further, representations of lists other than trees may be used. Many other variations are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for managing requests in a computing environment, the computer program product comprising:
 a non-transitory storage medium readable by a processing circuit and storing instructions for execution by the processing circuit for performing a method comprising:
  receiving, by at least one processor, a global batch of requests, the global batch of requests comprising a plurality of locally batched requests combined to provide the global batch of requests, the plurality of locally batched requests batched into the global batch of requests based on a selected criterion;
  determining whether a request of the global batch of requests is to be scheduled to run, wherein the determining uses a utility function that is based on energy aspects of the computing environment to determine if the request is to be scheduled; and
  scheduling the request to run, based on the determining indicating the request is to run.

2. The computer program product of claim 1, wherein the request is to run on a computing unit of a datacenter, said datacenter comprising a plurality of computing units.

3. The computer program product of claim 2, wherein the computing unit to run the request is a low power computing unit.

4. The computer program product of claim 2, wherein the energy aspects include at least one of power cost for the request, utilization of one or more computing units of the datacenter, whether there are one or more computing unit memories of the datacenter in which the request can be piggybacked with one or more other requests, whether there are one or more disks of the datacenter in which the request can be piggybacked, or whether there are one or more power-capped computing units of the datacenter.

5. The computer program product of claim 1, wherein the scheduling includes:
 performing at least one of preloading or prelocating data to be used by the request in a queue accessible by one or more computing units to execute the request;
 and placing the request on a run queue.

6. The computer program product of claim 1, wherein the method further comprises:
obtaining, by a global dispatcher, the plurality of locally batched requests from one or more computing units coupled to the global dispatcher;
batching, by the global dispatcher, the plurality of locally batched requests to form the global batch of requests; and
forwarding, by the global dispatcher, the global batch of requests to the at least one processor.

7. The computer program product of claim 1, wherein the receiving comprises receiving the global batch of requests using one or more low power links.

8. The computer program product of claim 7, wherein the requests of the global batch of requests are indicated as green requests.

9. The computer program product of claim 1, wherein the request is executing on a computing unit, and the method further comprises:
determining whether the request is to be migrated from the computing unit to another computing unit for energy efficiency.

10. The computer program product of claim 9, wherein the determining comprises deciding whether the computing unit is a low utilization computing unit, and wherein the request is migrated, based on the deciding indicating the computing unit is a low utilization computing unit.

11. The computer program product of claim 1, wherein the method further comprises:
determining whether a request is to be included in a local batch of requests, wherein the determining comprises:
obtaining an energy estimation for the request; and
including the request in the local batch of requests, based on the energy estimation indicating a cost associated with executing the request is acceptable.

12. A computer system for managing requests in a computing environment, the computer system comprising:
a memory; and
a processor in communications with the memory, wherein the computer system is configured to perform a method, the method comprising:
receiving, by at least one processor, a global batch of requests, the global batch of requests comprising a plurality of locally batched requests combined to provide the global batch of requests, the plurality of locally batched requests batched into the global batch of requests based on a selected criterion;
determining whether a request of the global batch of requests is to be scheduled to run, wherein the determining uses a utility function that is based on energy aspects of the computing environment to determine if the request is to be scheduled; and
scheduling the request to run, based on the determining indicating the request is to run.

13. The computer system of claim 12, wherein the request is to run on a computing unit of a datacenter, said datacenter comprising a plurality of computing units, and wherein the energy aspects include at least one of power cost for the request, utilization of one or more computing units of the datacenter, whether there are one or more computing unit memories of the datacenter in which the request can be piggybacked with one or more other requests, whether there are one or more disks of the datacenter in which the request can be piggybacked, or whether there are one or more power-capped computing units of the datacenter.

14. The computer system of claim 12, wherein the scheduling includes:
performing at least one of preloading or prelocating data to be used by the request in a queue accessible by one or more computing units to execute the request; and
placing the request on a run queue.

15. The computer system of claim 12, wherein the receiving comprises receiving the global batch of requests from a global dispatcher, the global dispatcher configured to batch the plurality of locally batched requests obtained from one or more computing units coupled to the global dispatcher to provide the global batch of requests.

16. The computer system of claim 12, wherein the request is executing on a computing unit, and the method further comprises:
determining whether the request is to be migrated from the computing unit to another computing unit for energy efficiency.

17. The computer system of claim 12, wherein the locally batched requests include one or more requests determined to be included in the locally batched requests, wherein a request is determined to be in the locally batched requests based on an energy estimation of the request indicating a cost associated with executing the request is acceptable.

18. A method of managing requests in a computing environment, said method comprising:
receiving, by at least one processor, a global batch of requests, the global batch of requests comprising a plurality of locally batched requests combined to provide the global batch of requests, the plurality of locally batched requests batched into the global batch of requests based on a selected criterion;
determining whether a request of the global batch of requests is to be scheduled to run, wherein the determining uses a utility function that is based on energy aspects of the computing environment to determine if the request is to be scheduled; and
scheduling, by a processor of the at least one the processor, the request to run, based on the determining indicating the request is to run.

19. The method of claim 18, wherein the request is to run on a computing unit of a datacenter, said datacenter comprising a plurality of computing units, and wherein the energy aspects include at least one of power cost for the request, utilization of one or more computing units of the datacenter, whether there are one or more computing unit memories of the datacenter in which the request can be piggybacked with one or more other requests, whether there are one or more disks of the datacenter in which the request can be piggybacked, or whether there are one or more power-capped computing units of the datacenter.

20. The method of claim 18, wherein the locally batched requests include one or more requests determined to be included in the locally batched requests, wherein a request is determined to be in the locally batched requests based on an energy estimation of the request indicating a cost associated with executing the request is acceptable.

21. The computer program product of claim 1, wherein the receiving comprises receiving the global batch of requests from a global dispatcher, the global dispatcher configured to batch the plurality of locally batched requests obtained from one or more computing units coupled to the global dispatcher to provide the global batch of requests.

22. The computer program product of claim 1, wherein the locally batched requests include one or more requests determined to be included in the locally batched requests, wherein a request is determined to be in the locally batched requests based on an energy estimation of the request indicating a cost associated with executing the request is acceptable.

* * * * *